UNITED STATES PATENT OFFICE.

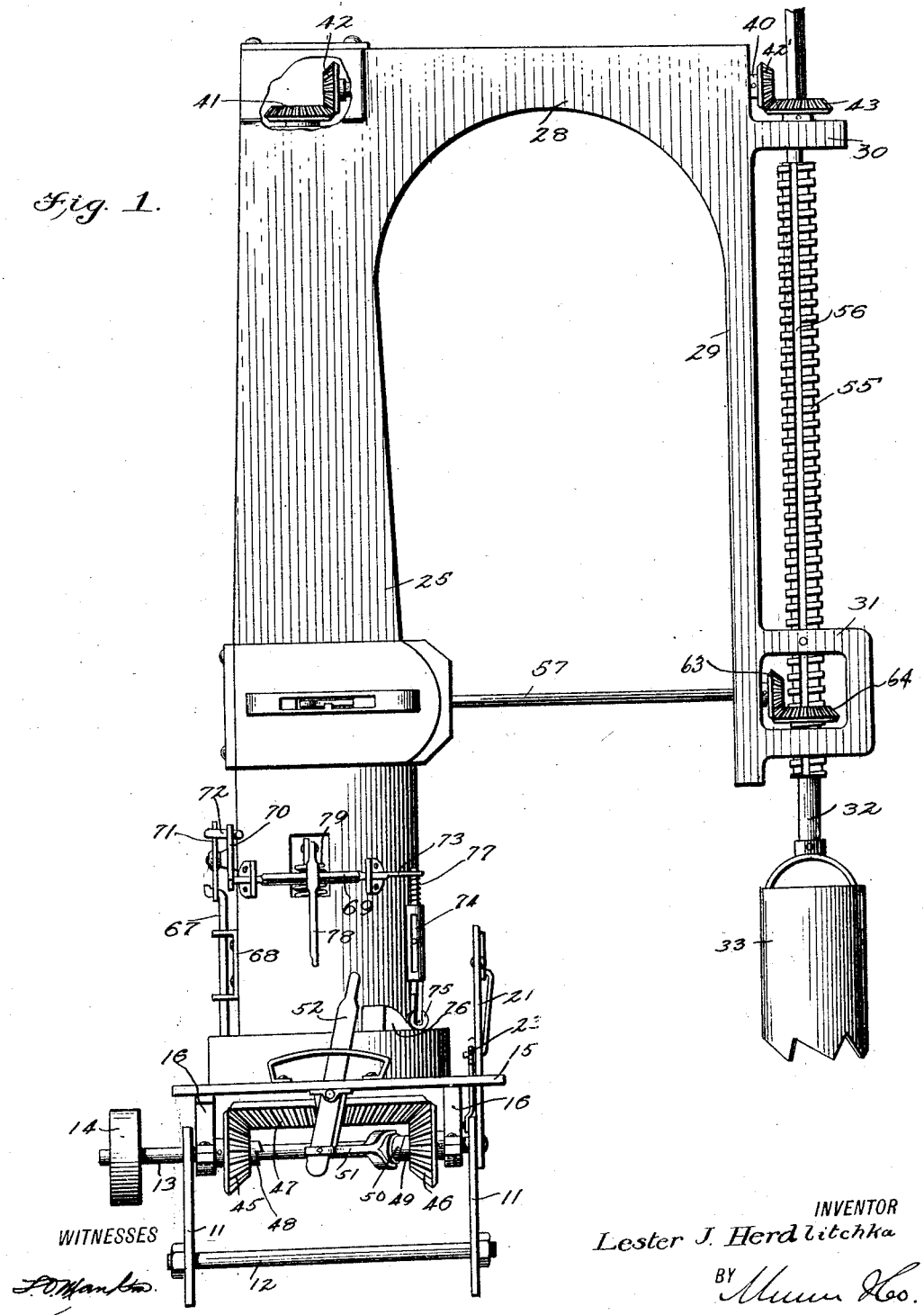

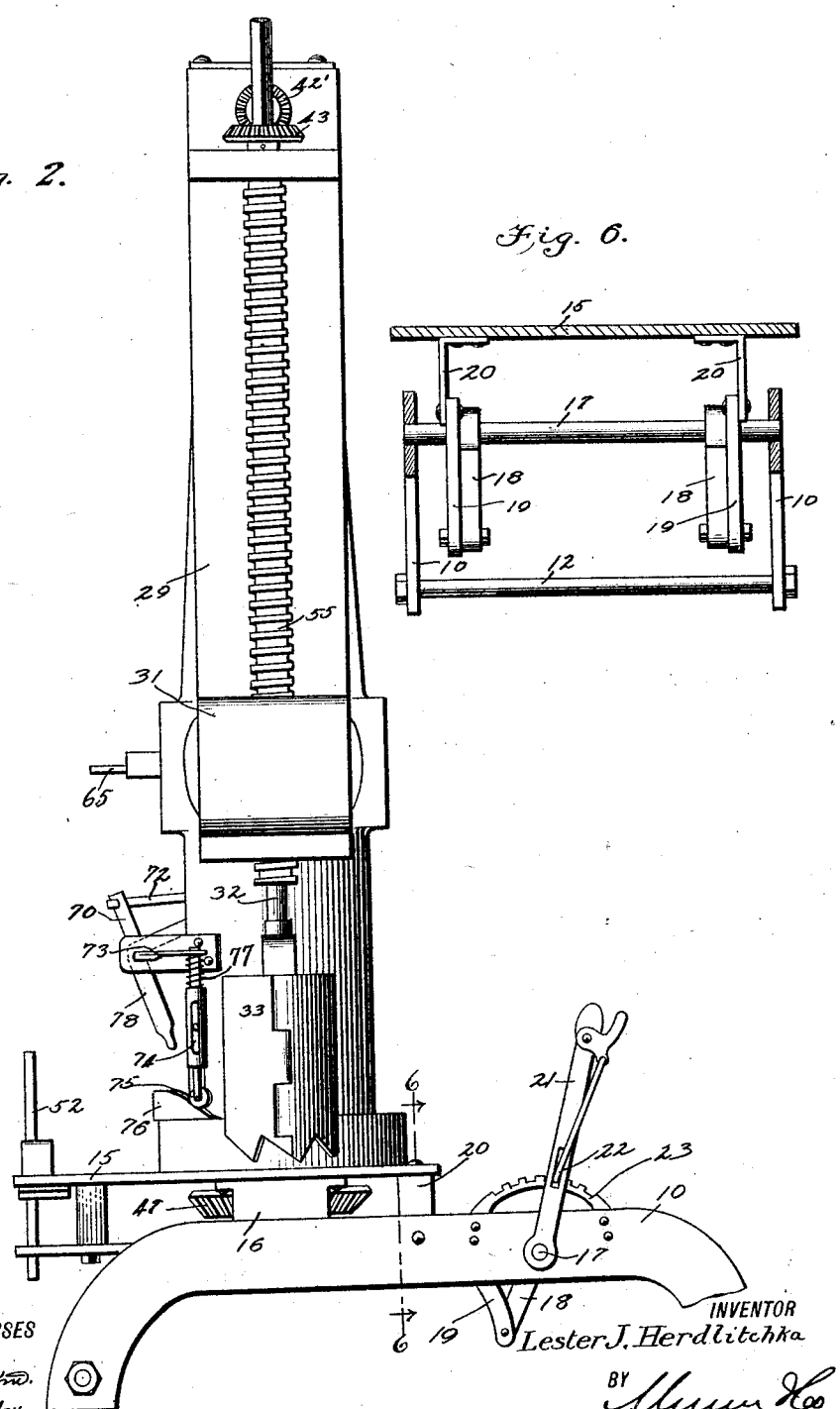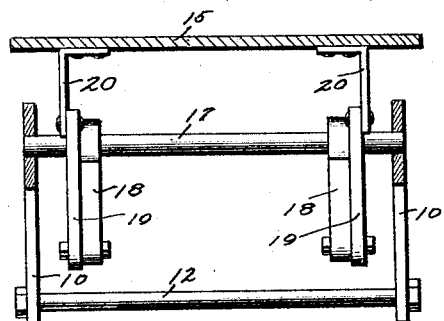

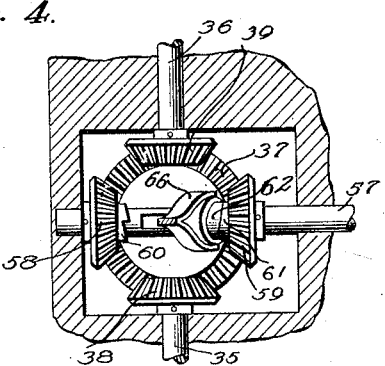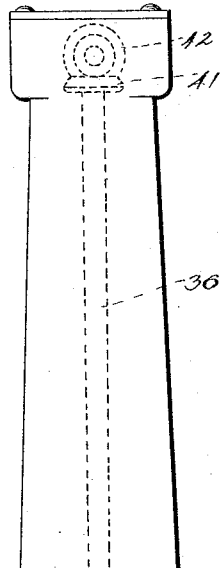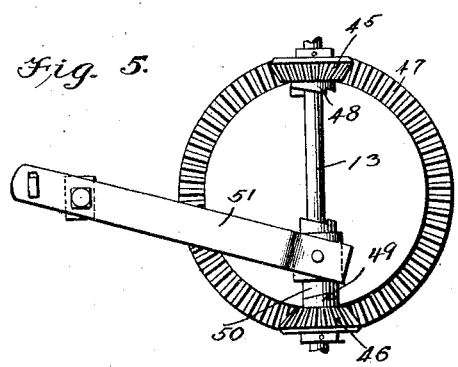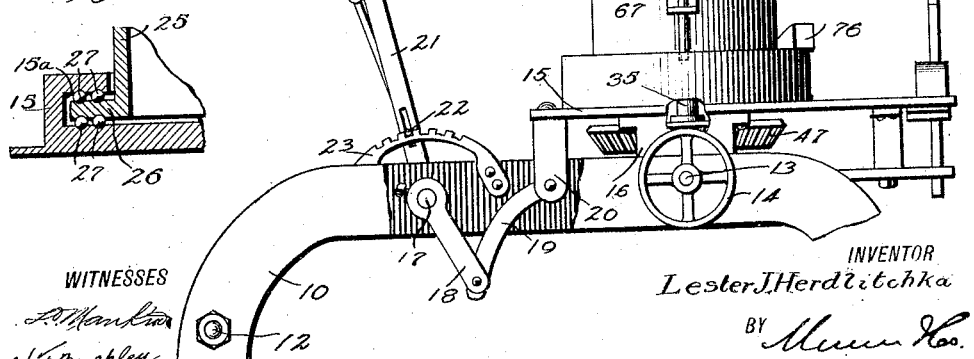

LESTER J. HERDLITCHKA, OF HUMBOLDT, NEBRASKA.

POWER POSTHOLE AUGER.

1,406,187.   Specification of Letters Patent.   Patented Feb. 14, 1922.

Application filed December 20, 1920. Serial No. 431,958.

*To all whom it may concern:*

Be it known that I, LESTER J. HERDLITCHKA, a citizen of the United States, and a resident of Humboldt, in the county of Richardson and State of Nebraska, have invented certain new and useful Improvements in Power Posthole Augers, of which the following is a specification.

The present invention relates to power posthole augers, and has for its object to provide an apparatus of this character which is adapted to effect the rapid boring or drilling of post holes which has a wide range of action and which is of simple and durable construction, reliable in operation, and easy and inexpensive to manufacture.

Other objects and advantages of the invention reside in certain novel features of construction, combination and arrangement of parts which will be hereinafter more fully described and particularly pointed out in the appended claims.

In the accompanying drawings:

Figure 1 is a side elevational view of the invention;

Figure 2 is a front end elevational view thereof;

Figure 3 is a rear end elevational view thereof, parts being broken away for the sake of illustration;

Figure 4 is a detail view in side elevation of the reverse gearing of the feed drive, adjacent parts being shown in fragmentary section;

Figure 5 is a detail view in bottom plan of the clutch mechanism of the drive;

Figure 6 is a transverse sectional view on line 6—6 of Figure 2, parts being omitted parts being shown in elevation for the sake of illustration; and Figure 7 is a detail view in section, illustrating the rotatable mounting of the column.

Referring to the drawings wherein for the sake of illustration is shown the preferred embodiment of my invention, it is seen that the invention is mounted upon a suitable support, designated generally at 10, preferably including spaced side members 11 and cross bars 12. A main shaft 13 is rotatably mounted in suitable journals provided therefor in the side members 11, and is adapted to be driven from any type of power plant by means of a pulley or the like 14. A base 15 is provided and has a pair of journals 16 through which the main shaft 13 also extends whereby the base is rotatably supported on the main shaft 13. Means is provided for maintaining the base in desired position on the main shaft 13 and includes a rock shaft 17 journaled in the side members 11 and having fixed thereto arms 18 which are pivoted at their outer ends to the outer ends of curved links 19 which in turn are pivotally connected at their other or inner ends to brackets 20 fixed to the base 15. A hand lever 21 is also fixed to the rock shaft 17 and carries a manually controlled spring pressed pawl 22 adapted to cooperate with the segmental rack 23 fixed to one of the side members 11. It is obvious that by adjusting the hand lever and setting the same in adjusted position by means of the coaction of the pawl 22 and the rack 23 that the base will be maintained in desired position whether it be horizontal or otherwise.

A column 25 is rotatably mounted on the base by means of an annular flange 26 at its lower end and ball bearings 27 which operate in a circular way 15ᵃ provided in the base 15. Integrally or otherwise formed with the column at its upper end is an arbor 28 which includes a depending arm 29 having bearing brackets 30 and 31 provided thereon.

A drill rod 32 is rotatably journaled in the bearing brackets 30 and 31, being directly journaled in the bearing bracket 30 and indirectly in the bracket 31, as will hereinafter more fully appear. An auger or bit 33 is releasably secured to the lower end of the drill rod 32 and may be of any desired type or construction.

Means is provided for driving or rotating the drill rod 32 from the mainshaft 13 and includes spaced vertical shafts 35 and 36 journaled in the column 25 and constrained to corresponding motion by means of a master gear 37 interposed between the shafts 35 and 36 and meshing with beveled pinions 38 and 39 carried at the adjacent ends of the respective shafts. A horizontal shaft 40 journaled in the arbor 28 is driven from the upper vertical shaft 36 by means of beveled pinions 41 and 42 and drives the drill rod 32 by means of beveled pinions 42' and 43 upon the horizontal shaft and the drill rod, respectively. The lower vertical shaft 35 is driven from the main shaft in either direction so as to drive the drill rod in either direction by means of oppositely arranged beveled pinions 45 and 46, respectively, loosely mounted on the main shaft at spaced points and constantly meshed with the driven beveled gear 47 fixed to the lower end of the lower vertical shaft 35. The adjacent faces of the driving pinions 45 and 46 are provided with clutch members 48 and 49, respectively, which are adapted to selectively engage with a coacting clutch member 50 splined to the main shaft 13 so as to be freely movable longitudinally thereof but constrained to partake of all rotary motion therewith. The slidable clutch member 50 is controlled by means of a yoke bar 51 and a hand lever 52 pivoted to the base 15 and connected to the yoke bar 51.

Means is provided for feeding the drill rod longitudinally independently of the means for rotating the drill rod and includes a feed screw 55 loosely mounted on the drill rod but constrained against longitudinal movement relative thereto and having in its periphery a longitudinal key-way or groove 56. The feed screw 55 is suitably journaled in bearing brackets 30 and 31 and as the drill rod 32 is arranged within the feed screw it is also indirectly journaled in the bearing bracket 31. Means is provided for rotating the feed screw in either direction and consists of a jack shaft 57 journaled in the depending arm 29 and in the column and driven in either direction from the master gear 37 by means of oppositely arranged driven pinions 58 and 59 loosely mounted on the jack shaft 57 and constantly in mesh with the master gear 37. The pinions 58 and 59 are adapted to be clutched to the shaft 57 by means of clutch faces 60 and 61 formed on the adjacent faces of the respective pinions and adapted to cooperate with the clutch member 62 splined to the jack shaft 57. A pivoted control bar 65 including a yoke 66 embracing the clutch member 62 controls the clutch member 62 and effects the selective clutching of the driven pinions 58 and 59 to the jack shaft 57. The opposite end of the jack shaft from that adjacent the master gear has fixed thereto a beveled pinion 63 engaged with a beveled pinion 64 arranged on the feed screw and having a key engaged in the keyway of the lead screw. It is to be understood that the bearing bracket 31 or a portion thereof is formed to constitute a nut for the feed screw whereby when it is turned by the beveled pinion 64 it will be moved longitudinally.

Means is provided for securing the column against rotation relative to the base and includes a lock rod 67 vertically slidable in a bracket 68 secured to the column and controlled from a rock shaft 69 by means of a crank 70 at the end thereof, a bell crank lever 71 having one end pivoted to the lock rod and having the other arm connected with the crank 70 by means of a connecting rod 72. The opposite end of the rock shaft is provided with a second crank arm 73 with which cooperates a push rod 74 having a roller 75 at its lower end adapted to cooperate with a cam 76 carried by the base and having a resilient connection 77 at its upper end to the rock shaft 69. The rock shaft is also manually controlled by means of a hand lever 78 and is biased in its position by means of a compression coil spring 79 operating upon the rock shaft through the medium of the hand lever 78.

In operation the column having been adjusted and locked in adjusted position the clutch 50 is thrown into the pinion 45 in this embodiment of the invention to drive the drill bit or auger 33. The feed may then be thrown in by engaging the clutch 62 with the pinion 59 as shown in Figure 4. After the hole has been drilled or bored to the required depth, the direction of the rotation of the control bit or auger may be reversed by disengaging the clutch from the pinion 45 and engaging it with the pinion 46 and the feed may be reversed by disengaging the clutch 62 from the pinion 59 and engaging it with the pinion 58. When it is desired to release both the drive mechanism and feed mechanism from the power shaft or drive shaft the clutches are adjusted to occupy an intermediate position between the pinions 45 and 46 and the pinions 59 and 58, respectively.

It is to be noted that the line of feed of the drill bit and the point of application of the controlling action thereof may be regulated with precision and to best advantage as the column is not only rotatably mounted upon the base but the base itself may be tilted to the desired inclination with respect to the horizontal or may be maintained in horizontal position. Moreover the column is automatically locked in position on the base although it may be manually released at will. Breakable pins are incorporated in the motion transmission mechanism intermediate the main shaft and the auger. Preferably these pins are incorporated in the connection of the pinions 42' and 63 to their respective shafts. These pins are adapted to withstand all the stresses incident to the ordinary digging or drilling operations but when the auger strikes rock or other substance so hard or of such a nature as will work injury or damage to the parts of the machine, these pins will break under the action of these severe and unusual stresses and will thus preclude damage to the other elements of the auger.

It is to be noted also that when the roller 75 rides up on the cam 76 it imparts movement to the rock shaft 69. This movement of the rock shaft 69 is in turn transmitted to the lock rod 67 tending to urge the lock rod into one of the seats or cavities provided therefor in its base. These elements constitute a positive means whereby the lock rod is projected into locking position. It is to be noted that the resilient connection between the push rod 74 and the crank arm of the rock shaft permits the necessary relative movement between the lock rod and the base prior to the projection of the lock rod into its seat. In this manner the column is automatically and positively locked in one position on the base which is preferably the most advantageous drilling position. In the other positions in which it may be desirable to lock the column relative to its base, the coil spring 79 is normally adequate but if it should not be so the lock rod may be manually projected by means of the hand lever 78. It is to be noted that the coil spring 79 supplements the action of the cam roller and push rod, etc., in projecting the lock rod into position.

I claim:

1. In a power post-hole auger, a support including spaced side members, a main shaft rotatably journaled in said support, a base having depending bearings journaled on said main shaft, means for controlling the psition of the base relative to the support including a rock shaft, an arm fixed to said rock shaft, a bracket fixed to said base, a curved link connecting said arm and said bracket, a hand lever fixed to said rock shaft, a spring pressed detent carried by said hand lever and a coacting rack segment fixed to said support, a column rotatably journaled in said base, an arbor integral with the upper end of the column and having a depending arm provided with spaced bearings, a drill rod arranged in the bearings of said arm having a bit at its lower end, and means for driving the drill rod from the main shaft in either direction and feeding mechanism for the drill rod actuated from the main shaft.

2. In a power auger of the character described, a support, a main shaft journaled in said support, a base rotatably mounted on said main shaft, means for controlling the position of the base on said main shaft, a column rotatably mounted in said base having an integral arbor at its upper end provided with a depending arm, means for controlling the position of said column relative to said base, a drill rod carried by the depending arm of the auger, means for driving the drill rod from the main shaft, and feeding means for the drill rod actuated from the main shaft.

3. In a power post hole auger, a support, a main shaft journaled in said support, a base rotatably mounted on said main shaft, means cooperable with the support for controlling the position of the base relative to the support, a column arranged upon the base including an arbor having a depending arm, a drill rod carried by the depending arm, means for driving the drill rod from the main shaft, including spaced vertical shafts journaled in the column, and a master gear interposed between said shafts, and means for feeding the drill rod including a jack shaft driven from the master gear.

4. In a power post hole auger of the character described, a main shaft, a column arranged above said main shaft, a drill rod, means for driving the drill rod from the main shaft including spaced shafts journaled in said column, a master gear interposed between said shafts and clutch controlling means for driving one of said shafts in either direction from said main shaft, and feeding means for the drill rod including a screw arranged upon the drill rod having a longitudinal spline therein, a driving pinion arranged on said screw and having a key seated in the spline, a jack shaft for actuating said driving pinion, and clutch controlled means for driving said jack shaft in either direction from the master gear.

5. In a power post hole auger of the character described, a support including spaced members, a main shaft rotatably journaled in said support, a base rotatably mounted on said main shaft, means for controlling the position of said base relative to said support including a rock shaft journaled in said support having a lateral arm fixed thereto, a bracket fixed to said base, a link connecting said bracket and said arm, and a lever for controlling said rock shaft, a column rotatably journaled on said base, means for controlling the position of said column relative to said base, a drill rod carried by the column, means for driving the drill rod from the main shaft, and feeding means for the drill rod actuated from the main shaft.

6. In a power post hole auger of the character described, a base having a circular way, a column having an annular flange at its lower end rotatably received in the circular way, means for controlling the position of said column relative to said base including a lock rod slidably arranged on the column and engageable with the base, a cam controlled rock shaft and motion transmission means between the rock shaft and the lock rod, a drill rod carried by the column, means for driving the drill rod and feeding means for the drill rod.

7. In a power post hole auger of the character described, a base having a circular way, a column having an annular flange at its lower end rotatable longitudinally in said circular way, means for controlling the position of said column relative to said base including a lock rod slidably arranged on the column and engageable with the base, a rock shaft, a push rod operably connected with said rock shaft and having a roller at its lower end, a cam carried by the base and engageable with the roller and motion transmission means between the rock shaft and the lock rod, a drill rod carried by the column, means for driving the drill rod and feeding mechanism for the drill rod.

8. In a power post hole auger of the character described, a main shaft, a column, a drill rod carried by said column, clutch controlled means for driving the drill rod in either direction from the main shaft including a master gear, and clutch controlled feeding mechanism for feeding the drill rod in either direction from the master gear.

9. In a power post hole auger of the character described, a support, a main shaft journaled in said support, a base, a column arranged on said base having an arbor including a depending arm provided with bearings, a drill rod arranged in said bearings, clutch controlled means for driving the drill rod from the main shaft in either direction, and clutch controlled feeding mechanism for advancing the drill rod in either direction.

10. In a power post hole auger of the character described, a main shaft, a drill rod, clutch controlled means for driving the drill rod from the main shaft in either direction and clutch controlled feeding mechanism actuated from the main shaft for advancing the drill rod in either direction.

LESTER J. HERDLITCHKA.